United States Patent [19]
Adam et al.

[11] Patent Number: 6,010,403
[45] Date of Patent: Jan. 4, 2000

[54] SYSTEM AND METHOD FOR DISPLAYING AN INTERACTIVE EVENT

[75] Inventors: Richard D. Adam, Cupertino; Terry L. Farnham, San Jose, both of Calif.

[73] Assignee: LBE Technologies, Inc.

[21] Appl. No.: 08/985,938

[22] Filed: Dec. 5, 1997

[51] Int. Cl.[7] .................................................. A63F 9/14
[52] U.S. Cl. .............................. 463/6; 434/66; 434/99
[58] Field of Search ........................... 463/1, 6, 40, 41, 463/42, 43, 30–36; 434/43–44, 307, 308, 66–69; 273/441–445, 434

[56] References Cited

U.S. PATENT DOCUMENTS

| | | | |
|---|---|---|---|
| 3,898,746 | 8/1975 | Seidle | 434/69 |
| 4,846,686 | 7/1989 | Adams | 434/69 |
| 5,184,956 | 2/1993 | Langlais et al. | 434/69 |
| 5,577,913 | 11/1996 | Moncrief et al. | 434/69 |
| 5,618,179 | 4/1997 | Copperman et al. | 434/69 |
| 5,707,237 | 1/1998 | Takemoto et al. | 434/69 |

*Primary Examiner*—Jessica J. Harrison
*Assistant Examiner*—Sheila Clayton
*Attorney, Agent, or Firm*—Ronald C. Fish; Falk & Fish

[57] ABSTRACT

This disclosure is directed to novel systems and methods for displaying an interactive event, such as a race car video game. Numerous display devices are disclosed for displaying video and audio elements of the video game to both current players and to individuals not currently playing the video game. The race car video game further has seating for two occupants, a driver and a crew member and has a separate video monitor for the crew member, through which the crew member can selectively view the race from different viewpoints and can obtain race information. The display of the race car game to individuals not currently playing the game varies according to several factors to enhance the attraction and interest in the race car video game.

26 Claims, 5 Drawing Sheets

SYSTEM AND METHOD FOR DISPLAYING AN INTERACTIVE EVENT

FIELD OF INVENTION

The present invention relates generally to video and audio display systems, and, more particularly, to novel systems and methods for presenting an audio/video display of an interactive event.

BACKGROUND

In recent years, arcade-type video games have become increasingly popular. As a way to attract more attention and interest in a given video game, video game designers have endeavored to make the play of video games viewable to people in addition to the current players of the game. Indeed, it is well-known in the video game industry that the more people that can view what is going on with a particular video game, the more popular, and thus profitable, the game will be.

In attempting to make the play of video games viewable by people in addition to the current players of a video game, overhead monitors have been developed. Conventional overhead monitors are positioned on the video game above the current player of the game so that individuals not currently playing the video game who are standing behind the current player can see what is being presented on the player's monitor. In many conventional overhead monitors, both the player's monitor and the overhead monitor present exactly the same video output.

Subsequently, as an attempt to bring additional attention and interest to a given game, the overhead monitors were designed to periodically cycle through a pre-determined set of views. For example, in a race car game, the pre-determined views might include views from different drivers' cars, overhead views, etc. These overhead monitor displays routinely cycle through the pre-determined views without any regard to what is actually happening in the game. As such, the current overhead view might display a view where relatively little was happening at a time when a significant game event, such as a car crash, is happening elsewhere on the game and would be effectively illustrated by a different view.

Additionally, conventional overhead monitors produce a video display only. No audio presentation is associated with conventional overhead monitor video displays, rendering the displays significantly less interesting than the game being played. Hence, the failure to provide an audio element to the display for individuals not currently playing the game is a significant limitation of conventional overhead video game display systems.

Further, conventional race car video games have been designed for only one occupant within the game race car. It is common, however, in real professional race car racing to have a second individual, a crew member, in the stands to act as a "spotter" to provide the driver, via radio, with information regarding the other race cars and race conditions so as to permit the driver to focus his attention on operating the car. By failing to provide for a second occupant, or input from a second individual such as a spotter, conventional race car games are less competitive than they could be by providing for a spotter to sit with the driver in the game race car and to provide the game operator or the driver with important information regarding the other cars in the race and race conditions generally.

Moreover, conventional race car video games fail to provide the players with the ability to selectively choose between different views, such as side views, rear views, helicopter views, etc. without changing the driver's view, despite the fact that information from such views may be interesting and important to the race. Such conventional race car video games also fail to provide the players with an opportunity to access race statistics on their car and the other cars during a race. Such information can be extremely helpful in competing in a video game race. Accordingly, due to these limitations, conventional video games and particularly conventional race car games have proven to be inadequate in producing a complete simulation and display of an automobile race.

BRIEF SUMMARY AND OBJECTS OF THE INVENTION

In brief summary, the present invention overcomes or substantially alleviates prior art problems related to the presentation of an audio/video display of an interactive event, such as a video game, and more particularly a race car video game. The present invention provides novel systems and methods for presenting audio and video elements of an interactive event to increase the enjoyment, popularity, and interest in the interactive event.

With the foregoing in mind, it is a primary object of the present invention to overcome or substantially alleviate problems associated with prior art systems and methods for presenting an audio/video display of an interactive event.

Another object of importance is the provision of a system, and related methods, for presenting audio and video elements of a video game to individuals not currently playing the game, where the audio and visual elements are presented according to what is happening in the game.

A further paramount object is the provision of a race car video game which provides for a driver and a spotter within the game race car so that the spotter can obtain race information and convey that information to the driver.

It is an object of considerable value to provide a system and method of presenting audio and video elements of a video game in which the presentation of video elements is, to some extent, randomized to enhance interest in the video game.

It is a dominant object to provide a system and method of presenting audio and video elements of a video game where the audio elements verbally describe or announce occurrences in the game as they occur.

It is another object of significance to provide a race car video game where the game race car includes a spotter monitor for the spotter to selectively receive race information.

These and other objects and features of the present invention will be apparent from the detailed description taken with reference to the accompanying drawings.

DETAILED DESCRIPTION OF THE ILLUSTRATED EMBODIMENTS

Figure 1:
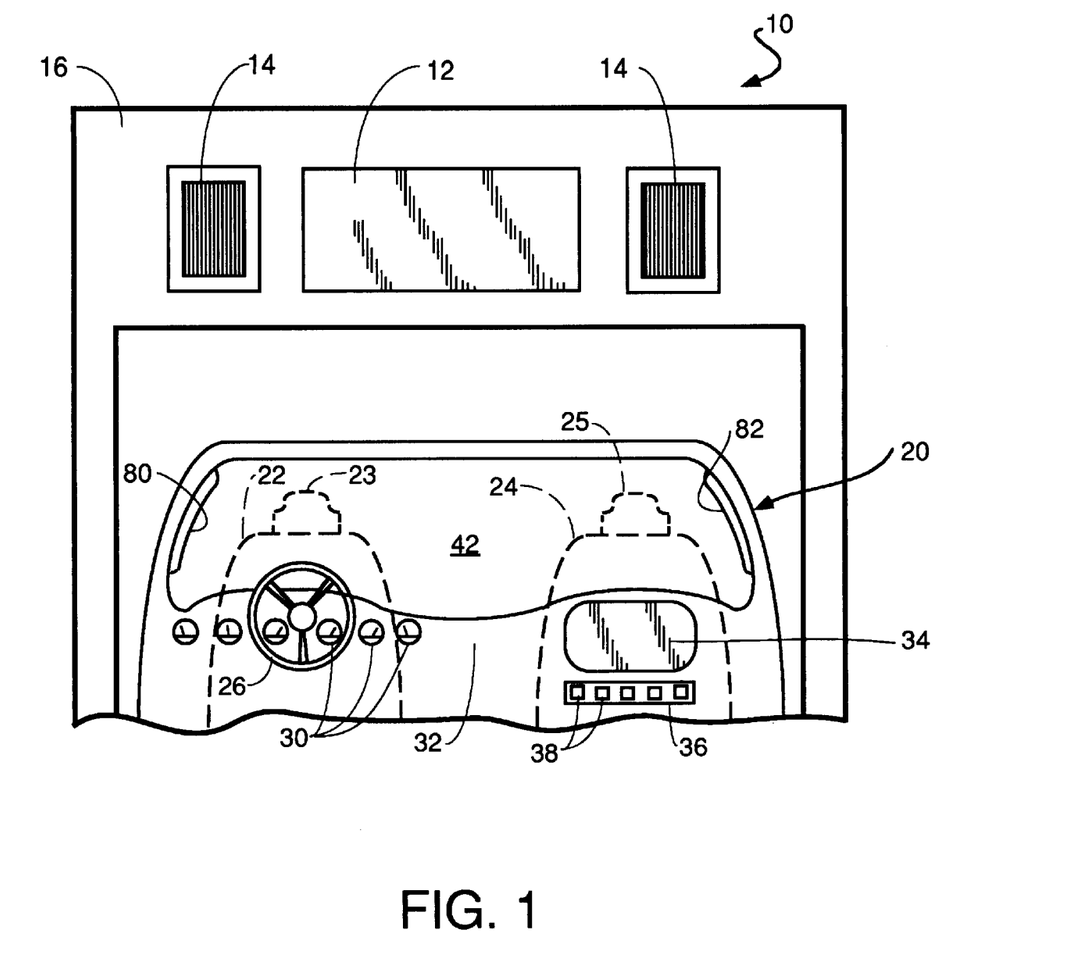
FIG. 1 is a rear elevation view of a race car video game according to the principles of the present invention.
Figure 2:
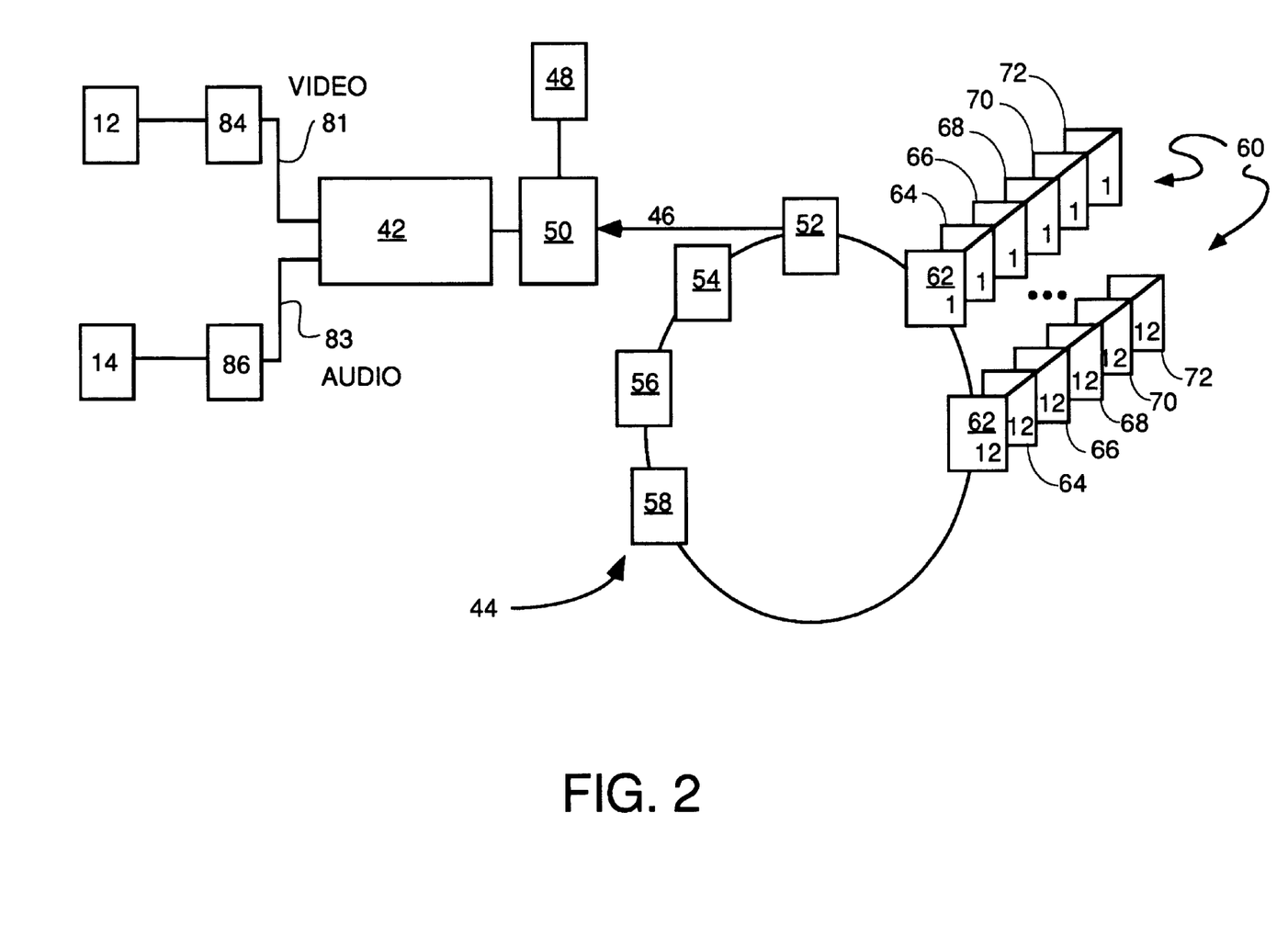
FIG. 2 is a schematic diagram of the system components of the video game of FIG. 1.
Figure 3:
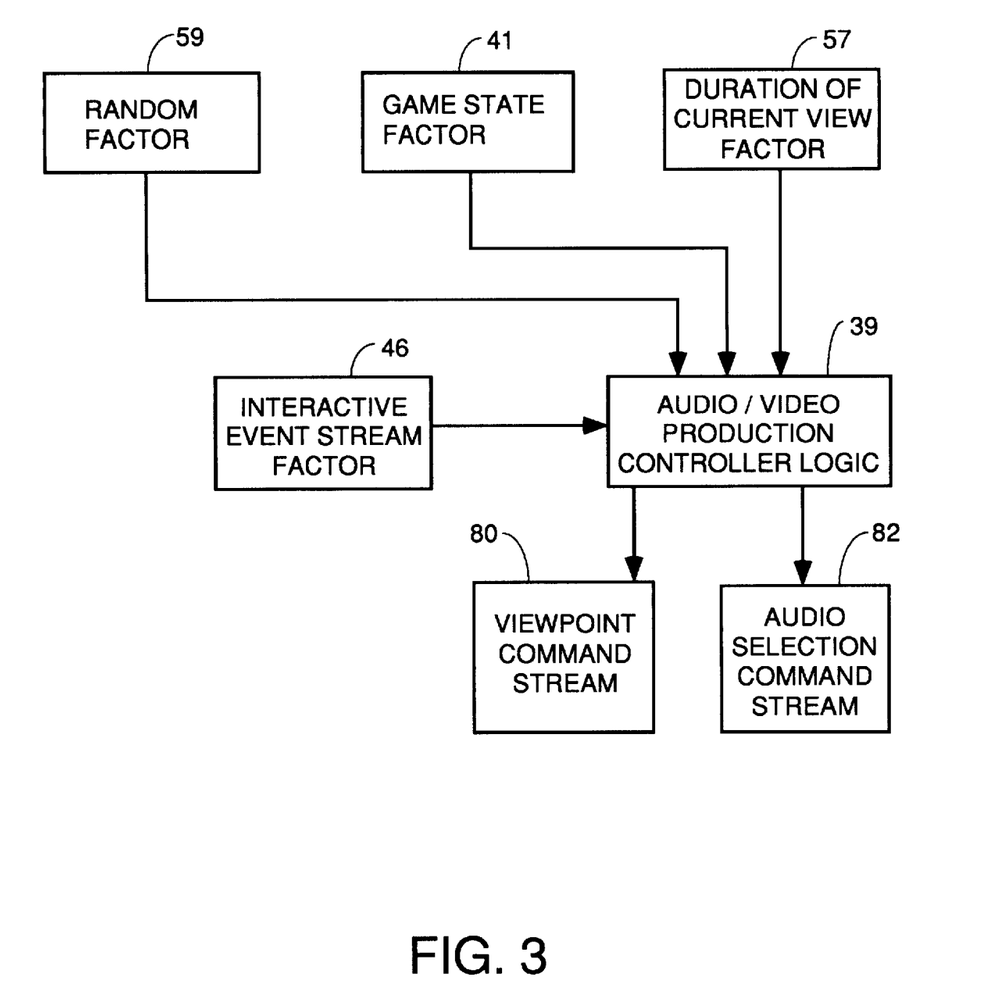
FIG. 3 is a diagram of the logic components of the audio/video production controller of FIG. 2.
Figure 4:
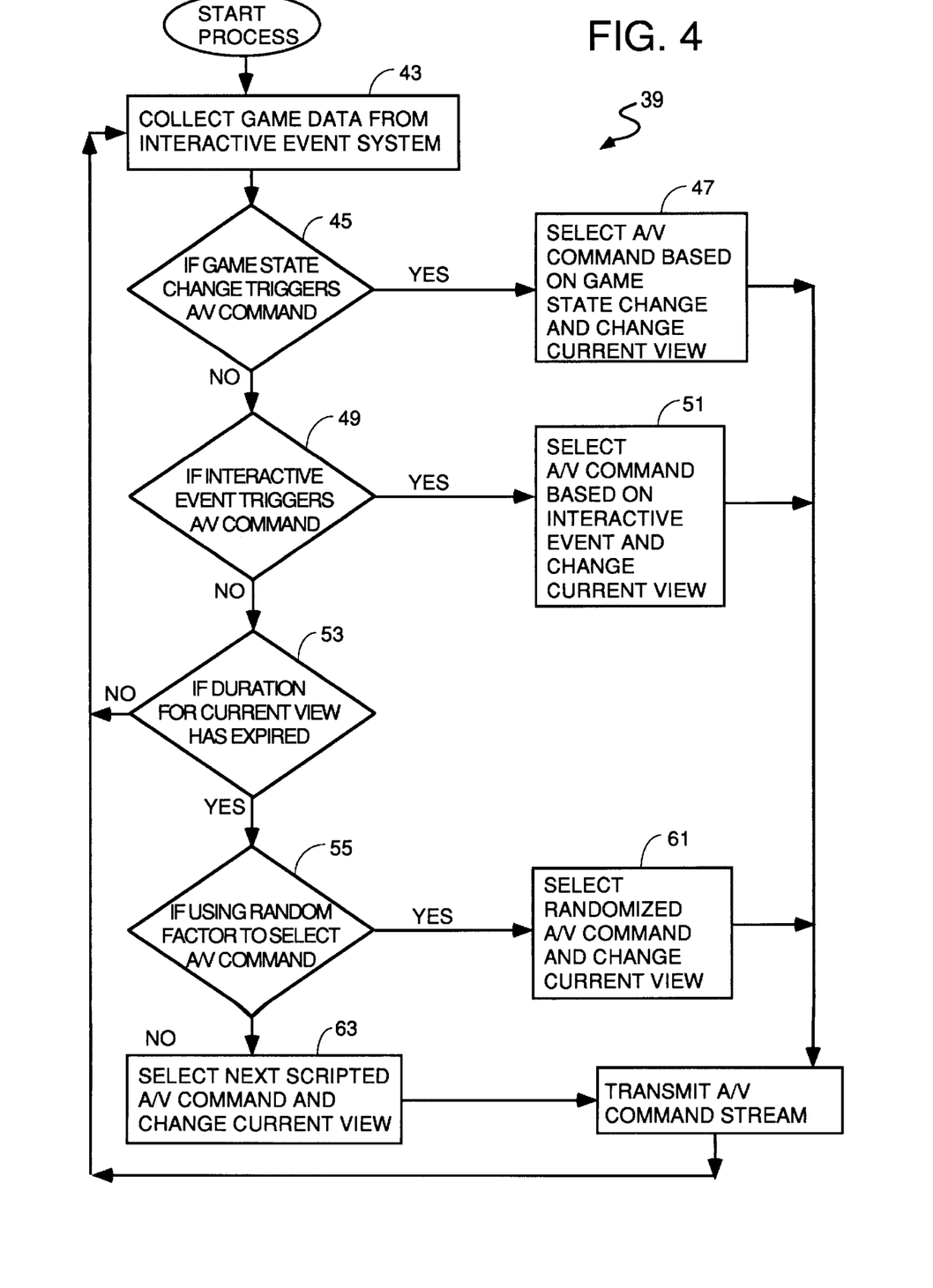
FIG. 4 is a flow chart diagram of the logic used in the audio/video production controller of FIG. 2.
Figure 5:
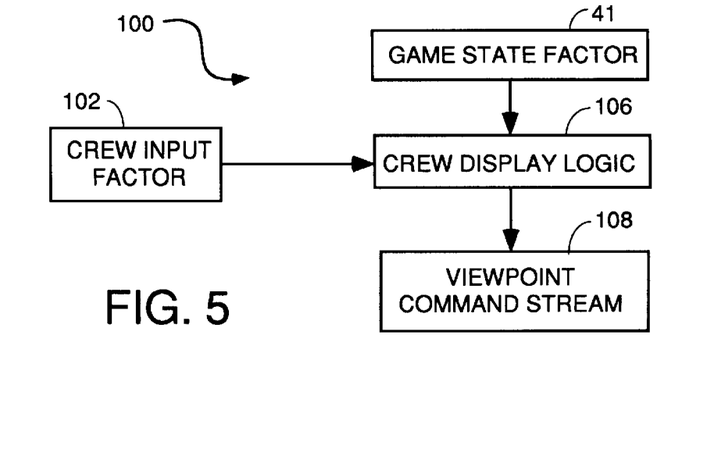
FIG. 5 is a schematic diagram of the system components of a crew display system of FIG. 2.
Figure 6:
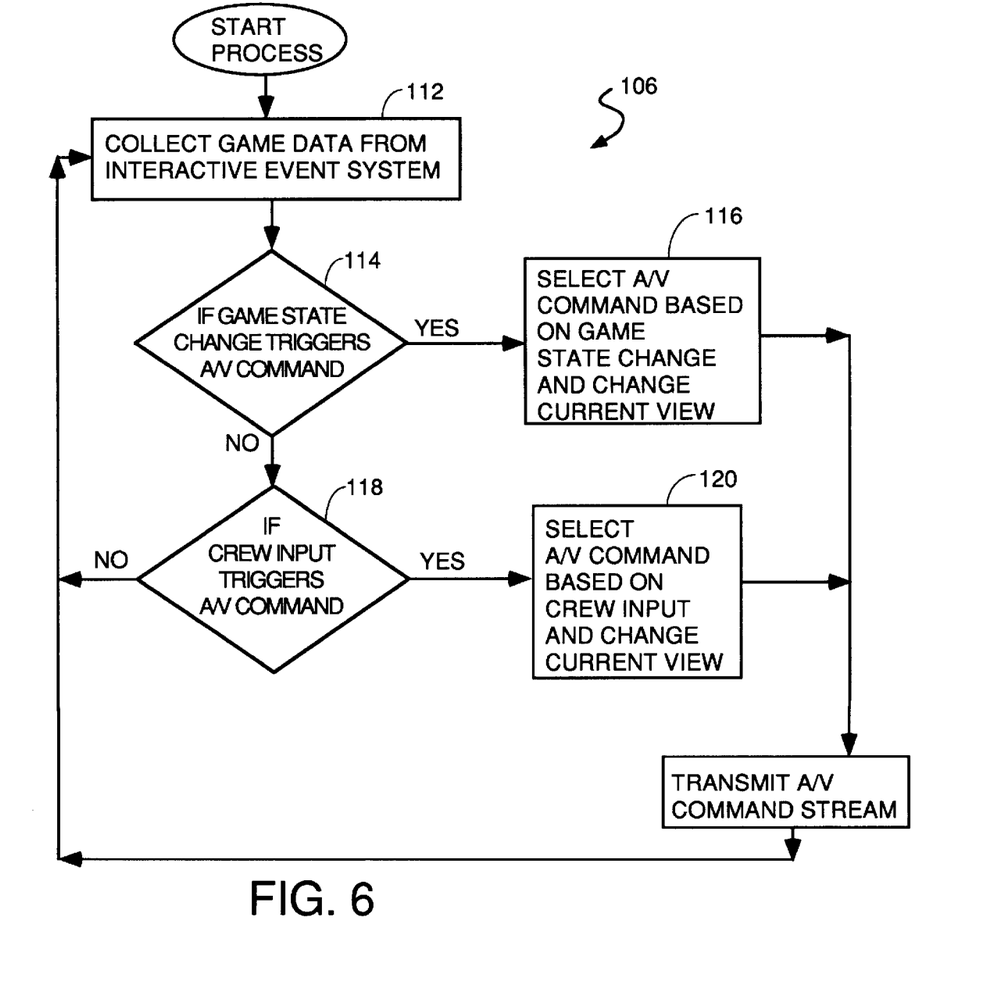
FIG. 6 is a flow chart diagram of the logic used in a crew display controller of FIG. 2.

Reference is now made to the drawings where like numerals are used to designate like parts throughout. FIG. 1 illustrates one of many video games which may utilize the audio/video display methods and systems of the present invention. FIG. 2 illustrates schematically the unique configuration of system components of the video game display system. FIG. 3 illustrates in diagrammatic form the logic components of the audio/video production controller. FIG. 4 is a flow chart illustrating unique methodology by which an interactive event, such as a video game is displayed. FIG. 5 illustrates schematically the unique system components of the crew display system. FIG. 6 is a flow chart illustrating unique methodology by which a crew display monitor is driven.

As shown in FIG. 1, an interactive event system 10 is shown as generally comprising an overhead video monitor 12, overhead audio speakers 14 mounted within an overhead housing 16, and a game body 20 illustrated as being positioned beneath the monitor 12. It is to be understood that the illustrated configuration of FIG. 1 is merely exemplary and that the monitor 12, the speakers 14, and the game body 20 may be oriented in a wide range of configurations without departing from the scope of the present invention.

The game body 20 is shown as comprising a simulated race car. Driver seat 22 and crew member seat 24 are positioned adjacent to one another within the game body 20. A steering wheel 26 and driver gages 30 are positioned in front of the driver seat 22 on the dashboard 32 so that as a driver 23 sits in the driver seat 22, the steering wheel 26 is within comfortable grasp and the gages 30 are within the driver's view.

On the passenger side of the game body 20, a crew member video monitor 34 and a crew member switchboard 36 are mounted on the dashboard 32 substantially in front of the crew member seat 24. This configuration permits a crew member 25 to easily view the video monitor 34 and to access the switches 38 on the switchboard 36.

A driver front monitor 42 is positioned in front of both the driver seat 22 and the crew member seat 24. Hence, as the driver 23 is seated in the driver seat 22 and the crew member 25 is seated in the crew member seat 24, the driver 23 and the crew member 25 look out what would be the windshield of a race car, the driver 23 and the crew member 25 view the front monitor 42. A left side monitor 80 and a right side monitor 82 are respectively positioned on the left and right sides of the car body 20. A rear-view monitor may also be provided.

The video display for the overhead monitor 12 and the audio display for the overhead speaker 14 are driven by an audio/video production controller 42 as shown in FIG. 2. FIG. 2 generally illustrates, in diagram format, a computer network 44 which sends an interactive event stream 46 to the audio/video production controller 42 via a 100 Base T hub 50. The interactive event stream 46 may also be transmitted via the hub 50 to other additional elements 48 of the system.

The network 44 is illustrated as comprising a track official computer 52, drone computers 54 and 56, a dynamic force balance computer 58, and twelve local computer networks 60. Each local computer network 60 is associated with and controls an interactive event system 10. It must be noted that while twelve local computer networks 60 are illustrated in FIG. 2, virtually any number of local computer networks 60 can be networked as part of the network 44, depending on the desired number of interactive event systems 10 (FIG. 1). In the embodiment illustrated in FIG. 2, however, twelve local computer networks 60 are illustrated and described for use in connection with twelve interactive event systems 10. For ease of illustration, local computer networks 2 through 11 are represented by the " . . . " symbol and are identical in every respect to the local computer networks 1 and 12 of FIG. 2.

The purpose and function of the computers comprising the local computer networks 60 will now be described. Each local computer network 60 is illustrated as comprising a vehicle dynamics model (VDM) computer 62, a rear view mirror display computer 64, a left display computer 66, a right display computer 68, a center display computer 70, and a crew display controller 72. The VDM computer 62 computes the vehicle dynamics modeling for the player operating an associated interactive event system 10 and receives driver input from the interactive event system 10 from sources such as the steering wheel 26 (FIG. 1). Other input sources may include a brake input, a throttle input, and a gear shift input (not shown). Each VDM computer 62 calculates the position, velocity, acceleration, brake activity, throttle position, gear, and other information for the player with which it is associated. The VDM computer 62 further communicates with the other VDM computers 62 associated with and controlling the other interactive event systems 10 to monitor the velocity, acceleration, brake activity, throttle position, gear, and other information for the other players and/or drones. The purpose and function of the drones is discussed below.

Since each VDM computer 62 contains information regarding the current status of the interactive event system 10 that it is controlling as well as status information regarding the other players or drones, each VDM computer 62 is capable of modeling an entire race. Accordingly, the VDM computer 62 models the entire race and continually sends continually changing race modeling data to the rear view mirror display computer 64, the left display computer 66, the right display computer 68, the center display computer 70, and the crew display controller 72.

Hence, race data is received by the center display computer 70 from the VDM computer 62. From the race data received, the center display computer generates the appropriate video image to be displayed on the driver front monitor 42 (FIG. 1). Similarly, the left display computer 66, the right display computer 68, and the rear view mirror display computer 64 each receive race data from the VDM computer 62 and respectively generate the appropriate video display for a driver left monitor 80, a driver right monitor 82 (FIG. 1), and a rear view monitor (not shown). These monitors 41, 80, 82, and the rear view monitor display a video which simulates what a driver would see under similar real driving conditions.

The dynamic force balance computer 58 monitors and arbitrates all vehicle collisions. That is, when two cars occupy the same space at the same time, the dynamic force balance computer 58 sends collision data back to the VDM computers 62, which, in turn, modify the race data accordingly.

The drone computers 54 and 56 are also in network communication with the VDM computers 62. The drone computers 54 and 56 provide race data regarding cars not driven by actual players. Generally, it is desirable to have a twenty-car race. Normally, however, fewer than twenty drivers 23 compete in a given race. Hence, the need to provide additional cars in the race is satisfied by the drone computers 54 and 56. Because the drone computers presently used are, individually, unable to provide all of the potentially required drone cars, two drone computers are employed.

The final computer in the network 44 is the track official computer 52. The track official computer 52 controls the entire race. It is the track official computer 52 that starts each race and tells each player when to go to the starting position for the race. The track official computer 52 also signals the end of the race. Further, the track official computer 52 controls the current game state. Example game states comprise the following: when a race is started, when the checkered flag is flown, periods of vehicle ingress (when the driver 23 and/or crew member 25 are entering the game body 20), and periods of vehicle egress (when the driver 23 and/or crew member 25 are exiting the game body 20).

Based on the race data from the various VDM computers 62 and the game state data, the track official computer 52 generates an interactive event data stream 46. The interactive event data stream 46 is sent via the hub 50 to the audio/video production controller 42 as shown in FIG. 2.

The audio/video production controller 42 transforms the interactive event data stream 46 into a viewpoint command stream 81 and an audio selection command stream 83. The viewpoint command stream 81 might include command to display the viewpoint from the inside of the car that is currently leading the race, from other viewing positions and perspectives from other cars, or from fixed positions on and around the race track. The logic 39 by which the audio/video production controller 42 selects the current viewpoint is illustrated diagrammatically in FIG. 3 and in flow chart format in FIG. 4, and is discussed below.

The first step undertaken by the audio/video production controller 42 is to collect interactive event data stream 46. This step is shown in box 43 of FIG. 4. As illustrated in FIG. 2, the interactive event data stream 46 is shown as being collected from the track official computer 52 via the hub 50.

Next, the audio/video production controller 42 checks the interactive event data stream 46 to determine whether there has been a change in game state 41, such as the commencement of a new race, the waiving of the checkered flag, etc. This step is shown in diamond 45 in FIG. 4. If the current game state has changed since the last time the game state was checked by the audio/video production controller 42, an audio/video command is selected from a set of pre-programmed audio/video commands and an associated audio selection command stream 83 is sent to the audio storage and generation system 86 and an associated viewpoint command stream 83 is sent to the video generation system 84. This step is illustrated in box 47 of FIG. 4. The purpose and function of the audio storage and generation system 86 and the video generation system 84 is discussed below.

If the game state has not changed since the last time the game state was checked by the audio/video production controller 42, the audio/video production controller 42 checks the interactive event data stream 46 to determine whether a pre-determined interactive event has occurred, such as a car crash a car spin-out, etc. This step is illustrated by a diamond 49 of FIG. 4.

If such a pre-determined interactive event has occurred, then a audio/video command associated with the particular pre-determined interactive event is selected from a set of pre-programmed audio/video commands and an associated audio selection command stream 83 is sent to the audio storage and generation system 86 and an associated viewpoint command stream 81 is sent to the video generation system 84. This step is shown as box 51 in FIG. 4. Thus, for example, if a car crash occurs as a pre-determined interactive event, a viewpoint command focusing on the crash is sent to the video generation device 84 so that individuals not currently playing the game can view the interactive event as it happens. An associated audio selection command stream 83, which preferably includes an announcer's verbal commentary is also transmitted to the audio storage and generation system 86.

By sensing certain interactive events and producing audio and visual output elements that correspond to the interactive events, the viewer is given the perception that the interactive event is being covered by a live camera crew and a live announcer which respectively select viewpoints according to interactive events taking place within the race and provide verbal commentary regarding the interactive events as, or shortly after, they occur.

Next, assuming there has been no change in the game state 41 and that no interactive event has triggered an audio/video command, the audio/video production controller 42 determines how much time 57 has passed since the current viewpoint on the video display 12 has changed. This determination is represented by diamond 53 of FIG. 4. If the current viewpoint has been has been the current viewpoint for more than a predetermined amount of time, then the audio/video production controller 42 uses a random factor to determine whether to either: (1) randomly select an audio/video command or (2) to select a next audio/video command from a scripted set of audio/video commands. This determination is represented by diamond 55 in FIG. 4.

If the current viewpoint on the video display has not been the current display for more than the predetermined amount of time, the audio/video production controller 42 starts the logic process again by collecting data from the interactive event data stream 46 and proceeds as previously described. This step is represented by box 43 of FIG. 4.

In one embodiment of the present invention, the maximum amount of time allowed for a current view from the audio/video production controller 42 varies from about eight seconds to about twenty seconds. Advantageously, as the race progresses, the maximum amount of time allowed for a current view starts out relatively short, at about eight seconds, and progressively gets longer throughout the race.

As mentioned above, if the current view 57 has been the current view for longer than a certain amount of time, the audio/video production controller 42 employs a random factor 59 to determine how to choose the next view as shown in diamond 55 of FIG. 4. That is, on a random basis, the audio/video production controller 42 decides whether to randomly select the next audio/video command or to select the next audio/video command from a scripted set of audio/video commands. Randomly selecting the basis upon which the next view is selected enhances the variety of the audio/video display and thus aids in increasing attention and interest in the interactive event generally.

If the audio/video production controller 42 randomly determines to select the next audio/video command from a scripted set of audio/video commands, the audio/video production controller 42 selects the next command from a preprogrammed script of audio/video commands and transmits the audio element of the selected audio/video command to the audio generation and storage device 86 and transmits the video element of the selected audio/video command to the video generation device 86. This step is shown in box 63 of FIG. 4.

On the other hand, if the audio/video production controller 42 randomly determines to randomly select the next audio/video command, then the audio/video production controller 42 selects, on a random basis, the next audio/video command from a set of predetermined audio/video commands. This step is shown in box 61 of FIG. 4.

It should be noted that the audio/video production controller logic 39 described above and illustrated in a flow chart format in FIG. 3, has a certain hierarchy associated with the logic. That is, the highest level factor in determining the current audio/video command stream is the game state factor 41. The game state factor 41 is then followed by the interactive event trigger 46, which is, in turn, followed by the duration of the current view factor 57. Thus, the logic 39 places more weight on certain factors, such as game state, than on other factors, such as the duration of the current view.

Additionally, it is important to note that while, in some instances, the audio and video elements of the audio/video command stream may be somewhat synchronized, the audio and video elements are not always synchronized. Moreover, the video commands 81 may be sent much more frequently than the audio commands 83. Indeed, in one embodiment, the audio and video elements of the audio/video command stream are transmitted on different channels with different frequencies.

The audio/video production controller 42 sends, using the methodology described above, viewpoint commands 81 to a video generation system 84 and audio selection commands 83 to an audio storage and generation system 86. The video generation system, in one embodiment, comprises a conventional 3-d accelerator card that typically is installed into a computer. The audio storage and generation system 86 generally comprises an audio storage element which is a library of audio samples which may be selectively played. The audio storage and generation system also comprises an audio generation element which operates in cooperation with the library of audio samples. In one embodiment, the audio generation element comprises a conventional computer audio card or a conventional sound blaster card which is installed into a computer.

Lastly, the audio components of the audio/video command are displayed, or played back, through conventional audio displays, such as the speakers 14 (FIG. 1). Likewise the video components of the audio/video command are displayed on conventional video displays, such as the monitor 12 (FIG. 1).

FIG. 5 illustrates a crew member display system 100 which generally comprises a crew input factor 102, the game state factor 41, crew display logic 106, and a crew display viewpoint command stream 108. FIG. 6 illustrates, in a flow chart format, the crew display logic 106. Further, FIG. 1 shows the crew member video monitor 34, the crew member switchboard 36, and the crew member input switches 38.

The purpose of the crew monitor display system 100 is to permit the crew member 25 (FIG. 1) to selectively obtain certain race data which can then be orally conveyed to the driver 23 to increase the competitiveness and enjoyment of the interactive event system 10. As illustrated in FIG. 5, the viewpoint of the crew member video monitor depends on two main factors, namely the game state factor 41 and the crew input factor 102. The game state factor 41 was described above in connection with the track official computer 52. The crew input factor 102 depends on the input from the crew member 25, via the switches 38 (FIG. 1) into the crew display controller 72 (FIG. 2).

The logic of the crew display system is as follows. First, the crew display system collects game data from the interactive event system, specifically from the VDM computer 62 associated with the crew display controller 72. This step is shown in box 112 of FIG. 6. From the game data, the crew display controller determines whether the game state has changed. This step is shown in diamond 114 of FIG. 6. If the game state has changed, then the crew display controller 72 selects an audio/video command based on the game state change and changes the current view of the crew display monitor 34 (FIG. 1) accordingly, as shown in box 116 of FIG. 6.

On the other hand, if the game state has not changed, then the crew display controller 72 determines whether there has been a crew member input 102 via the switches 38 (FIG. 1). If there has been crew member input 102, then the crew display controller selects an audio/video command based on the crew member input 102 and changes the crew display 102 accordingly. This step is shown as box 120 of FIG. 6.

Thus, the crew member 25 (FIG. 1) can selectively change the current view displayed on the monitor 34 and can cycle through a number of pre-selected views during the race. The current views might include a helicopter view of the entire race, the front view of the lead car, etc.

Additionally, the crew display controller drives the crew member video display 34 to display certain information regarding any of the various cars in the race. This information might include statistics such as the speed of each vehicle, the time intervals between cars, a leader board which continually ranks the cars in the race according to where each currently fits in the race, engine revolutions per minute, etc. Hence, the crew member can obtain this information by selectively actuating the switches 38 (FIG. 1). This information can significantly enhance the competitiveness of the race and assist the driver in making race decisions.

Further this information (the speed of each vehicle, the time intervals between cars, a leader board which continually ranks the cars in the race according to where each currently fits in the race, engine revolutions per minute, etc.) may also be transmitted via the audio/video production controller 42 and displayed on the video display 12 (FIG. 1). Displaying this information to individuals not currently playing the video game significantly increases these individuals' interest in the game.

The invention may be embodied in other specific forms without departing from the spirit of essential characteristics thereof. The present embodiments, therefore, are to be considered in all respects as illustrative and are not restrictive, the scope of the invention being indicated by the appended claims rather than by the foregoing description, and all changes which come within the meaning and range of equivalency of the claims are therefore intended to be embraced therein.

What is claimed is:

1. A method of displaying significant game events to bystanders watching a race simulation game comprising the steps:

receiving an event data stream from any video game system which simulates a race, said event data stream containing data which indicates when significant game events are occurring, and what type of significant game event is occurring and to which racers;

monitoring said event data stream for data indicating significant game events are occurring and responding to said significant game events by generating video signals that can be used to create an image of the significant game event as it is happening as if an actual race was being covered by a live television crew with multiple cameras and a live director was controlling which camera signals were selected for broadcast to a television viewing audience and the director selected the camera or cameras having the best position to show the event in the race which the significant game event simulates; and using said video signals to create an image of said significant game event on a monitor visible to bystanders watching the race simulation or using said video signals in a video projection system to create and project video images of the significant game event on a screen visible to bystanders watching the race simulation.

2. A method of providing video coverage and simulated live announcer audio descriptions of significant game events to bystanders watching a race simulation game, comprising the steps:

receiving an event data stream from any video game system which simulates a race, said event data stream containing data which indicates when significant game events are occurring, and what type of significant game event is occurring and to which racers;

monitoring said event data stream for data indicating significant game events are occurring and responding to said significant game events by generating video signals and audio signals, wherein said video signals generated in response to each significant game event can be used to create an image of the significant game event as it is happening in the race simulation as if an actual race was being covered by a live television crew with multiple cameras and a live director was controlling which camera signals were selected for broadcast to a television viewing audience and the director selected the camera or cameras having the best position to show the event in the race which the significant game event simulates, and wherein said audio signals generated in response to said significant game event can be used to provide a simulated live announcer's audible description of the significant game event;

using said video signals to create an image of said significant game event on a monitor visible to bystanders watching the race simulation or using said video signals in a video projection system to create and project video images of the significant game event on a screen visible to bystanders watching the race simulation; and using said audio signals to create an audible simulation of a live announcer's description of the significant game event as it occurs.

3. The method of claim 2, further comprising the steps of generating video and audio signals during the race simulation that provide general video coverage and simulated announcements by an announcer and race sounds that a television viewer of an actual race of the type being simulated would see and hear during the television coverage during intervals between significant game events.

4. The method of claim 2, wherein said event data stream includes game state data indicating the state of the race such as the simulated race is just starting or the simulated race is just finishing, and further comprising the step of monitoring said game state data and determining if there has been a change in game state, and, if the game state has changed, generating video signals and audio signals that are mapped to video and audio commands so as to create images and sounds for said bystanders that are appropriate to the new game state.

5. The method of claim 4 further comprising the step of timing the duration during which the current video and audio signals have been used to created images and sounds and monitoring said duration for the end of a predetermined interval, and when said predetermined interval is over, using a randomly generated factor to select new video and audio commands so as to change the images and sounds presented to said bystander.

6. The method of claim 4 further comprising the step of timing the duration during which the current video and audio signals have been used to created images and sounds and monitoring said duration for the end of a predetermined interval, and wherein said interval changes from a short interval of, for example, about 8 seconds at the beginning of the game to a longer interval of, for example, 20 seconds at the end of a game, and wherein said interval gets progressively longer as the race progresses and when said predetermined interval is over, determining if a randomly generated factor is going to be used to select new video and audio commands, and, if so, using said randomly generated factor to select new video and audio commands so as to change the images and sounds presented to said bystander, and, if not, selecting the next video and audio commands in a preprogrammed sequence of such commands to change the images and sounds presented to said bystanders.

7. A display apparatus for a video game, comprising:

an input for receiving an interactive event data stream containing data defining the types and times of events which are occurring in an interactive racing game simulating a real race wherein one or more players are competing against each other or computer controlled drones or both, said events including predetermined significant game events of interest to bystanders watching the race such as crashes and other events of significance to race results;

a production controller computer coupled to receive said interactive event data stream and programmed to generate video commands at a video command stream output which are used to control images displayed to said bystanders and the viewpoints of said images, and programmed to monitor said interactive event data stream for the occurrence of said significant game events and, when a significant game event occurs, to select and transmit one or more specially generated video commands, with the generation therof being controlled by which significant game event occurred to which race contestant so as to change the viewpoint and images displayed to said bystanders to show said significant game event as it happens;

a video generation system coupled to said video command stream output so as to receive said video commands and respond by generating video signals which can be displayed on a monitor or used by a video projection system to generate said images which present the action of the race and including circuitry to receive said specially selected video command or commands each time a significant game event occurs and respond by generating video signals which, when displayed on a video monitor or used by a video projection system to project an image, create an image for said bystanders of the significant game event as it happens, said image being similar to the images of a race event which the significant game event simulates which the bystanders would be likely to see if they were television viewers of a race in which such a race event occurred and a live television camera crew with multiple cameras were covering the race and a live director was controlling which signals from which cameras were broadcast to said television viewers so as to show the race event which the significant game event simulates; and a video monitor or video projection system and projection screen, positioned such that said bystanders can watch the race and coupled to receive said video signals generated by said video generation system and display video images that show said race to said bystanders and to show to said bystanders watching said race game significant game events in said simulated race as they happen.

8. The apparatus of claim 7 wherein said event data stream includes game state data and wherein said production controller is further programmed to monitor said event data stream for a change in said game state data, and when such a change occurs, generate video commands to cause said images displayed to bystanders to be changed so as to be appropriate to the new game state.

9. The apparatus of claim 7 further comprising means for timing the duration during which the current video signals have been used to created images and monitoring said duration for the end of a predetermined interval, and when said predetermined interval is over, using a randomly generated factor to select new video and audio commands so as to change the images and sounds presented to said bystander.

10. A display apparatus for a video game, comprising:

an input for receiving an interactive event data stream containing data defining the types and times of events which are occurring in an interactive racing game simulating a real race wherein one or more players are competing against each other or computer controlled drones or both, said events including predetermined significant game events of interest to bystanders watching the race such as crashes and other events of significance to race results;

an audio/video production controller computer coupled to receive said interactive event data stream and programmed to generate video commands at a video command stream output and audio commands at an audio command stream output, said video commands for use in controlling viewpoints of video images which show the race to bystanders and said audio commands for use in generating simulated announcer commentary and race sounds to give bystanders audio information about the race, said audio/video production controller also programmed to monitor said interactive event data stream for the occurrence of said significant game events and, when a significant game event occurs, to transmit out said video command stream output one or more specially generated video commands and to transmit out said audio command stream output one or more specially generated audio commands;

a video generation system coupled to said video command stream output so as to receive said video commands and respond by generating video signals which can be displayed on a monitor or used by a video projection system to generate video images which present the action of the race, said video generation system also containing circuits to receive said specially selected video viewpoint command each time a significant game event occurs and respond by generating video signals which, when displayed on a video monitor or used by a video projection system to project a video image, create an image of the significant game event selected to show the significant game event to bystanders watching the race game as if the race game bystanders were television viewers watching a race on television and a live television camera crew with multiple cameras were covering the race and a live director was controlling which signals from which cameras were broadcast to said television viewers so as to show a significant race event which the significant game event represents and simulates;

an audio generation system coupled to said audio command stream output so as to receive said audio commands and respond by generating audio signals which can be played through a speaker which describe the action of the race and/or provide other sounds a real spectator at a race might hear, said audio generation system also containing circuits to receive said one or more specially selected audio commands each time a significant game event occurs and respond by generating audio signals which, when played through a speaker simulate an announcer describing the significant game event to bystanders watching the race game as if the race game bystanders were television viewers watching a race on television and a live television camera crew with multiple cameras were covering the race and a announcer was describing a significant race event which the significant game event represents and simulates; and a video monitor or video projection system and projection screen, positioned such that said bystanders can watch the race and coupled to receive said video signals generated by said video generation system and display video images that show said race to said bystanders and to show to said bystanders watching said race game significant game events in said simulated race as they happen.

11. The apparatus of claim 10 wherein said event data stream includes game state data indicating the state of the race such as the simulated race is just starting or the simulated race is just finishing, and further comprising means for monitoring said game state data and determining if there has been a change in game state, and, if the game state has changed, generating video signals and audio signals that are mapped to video and audio commands selected from a list of preprogrammed video and audio command which video and audio commands can be used to create images and sounds for said bystanders that are appropriate to the new game state.

12. The apparatus of claim 11 further comprising means for timing the duration during which the current video and audio signals have been used to created images and sounds and monitoring said duration for the end of a predetermined interval, and when said predetermined interval is over, determining if a randomly generated factor is going to be used to select new video and audio commands, and, if so, using said randomly generated factor to select new video and audio commands so as to change the images and sounds presented to said bystander, and, if not, selecting the next video and audio commands in a preprogrammed sequence of such commands to change the images and sounds presented to said bystanders.

13. An apparatus for displaying significant game events to bystanders watching a race simulation game comprising:

an input for receiving an event data stream from any video game system which simulates a race, said event data stream containing data which indicates when significant game events are occurring and the type of event which is occurring and to which racers;

means for monitoring said event data stream for data indicating significant game events are occurring and responding to said significant game events by generating video signals that can be used to create an image of the significant game event as it is happening as if an actual race was being covered by a live television crew with multiple cameras and a live director was controlling which camera signals were selected for broadcast to a television viewing audience and the director selected the camera or cameras having a position to show the event in the race which the significant game event simulates; and means for using said video signals to create an image of said significant game event on a monitor visible to bystanders watching the race simulation or using said video signals in a video projection system to create and project video images of the significant game event on a screen visible to bystanders watching the race simulation.

14. An apparatus for providing video coverage and simulated live announcer audio descriptions of significant game events to bystanders watching a race simulation game, comprising:

an input for receiving an event data stream from any video game system which simulates a race, said event data stream containing data which indicates when significant game events are occurring and the type of event which is occurring and to which racers;

means for monitoring said event data stream for data indicating significant game events are occurring and responding to said significant game events by generating video signals and audio signals, wherein said video signals generated in response to each significant game event can be used to create an image of the significant game event as it is happening in the race simulation as if an actual race was being covered by a live television crew with multiple cameras and a live director was controlling which camera signals were selected for broadcast to a television viewing audience and the director selected the camera or cameras having a position to show the event in the race which the significant game event simulates, and wherein said audio signals generated in response to said significant game event can be used to provide a simulated live announcer's audible description of the significant game event; and video image generation means for using said video signals to create an image of said significant game event on a monitor visible to bystanders watching the race simulation or using said video signals in a video projection system to create and project video images of the significant game event on a screen visible to bystanders watching the race simulation;

audio sound generation means for using said audio signals to create an audible simulation of a live announcer's description of the significant game event as it occurs.

15. The apparatus of claim 14 wherein said means for monitoring said event data stream also generates video and audio signals during intervals between significant game events that provide general coverage of the simulated race.

16. The apparatus of claim 15 wherein said event data stream includes data indicating the status of the game and wherein said means for monitoring said event data stream also functions to monitor said event data stream for changes in game state, and changes said video and audio signals whenever there is detected a change in the game state to generate images and create sounds for the bystanders that are appropriate for the current game state, and wherein said means for monitoring also monitors a timer or counter to determine when the current video and audio signals have been used for a predetermined interval which increases in length over the duration of the game, and when said predetermined interval has elapsed, changing the video and audio signals output to said video image generation means and said audio sound generation means so as to change the images and sounds from the simulated race being presented to said bystander.

17. The apparatus of claim 16 wherein said monitoring functions are weighted such that the change of game state is weighted the highest in importance in priority to change said video and audio signals being generated, followed by any significant game event followed by said monitoring of said predetermined interval, said weighting operating to cause said monitoring function to look first for any game state change, and if a game state change is found, changing the video and audio signals in response thereto, and if no game state change has occurred, then monitoring said event data stream for the occurrence of a significant game event, and if one has occurred, changing said video and audio signals accordingly, and if no significant game event has occurred, then determining if said predetermined interval has passed and changing said video and audio signals when said predetermined interval has expired.

18. The apparatus of claim 15 wherein said means for monitoring changes said video signal much more frequently than it changes said audio signal.

19. The apparatus of claim 15 wherein said video image generation means comprises a computer having a 3D accelerator video circuit and wherein said audio sound generation means comprises a computer with an audio signal generation circuit coupled to an audio storage element having a library of audio samples of commentary and race sounds each of which can be selectively played in response to receipt by said audio signal generation circuit of a particular audio command generated by said means for monitoring.

20. A method for displaying video information to a crew member position in a simulation game having a simulated vehicle with at least two places being maneuvered through a race or any other environment, said simulated vehicle having a driver station with a driver display visible from both a driver position and a crew position in a simulated vehicle and a crew monitor positioned closest to a crew station in said simulated vehicle and having one or more crew switches located adjacent said crew monitor, comprising the steps:

displaying on said driver display images depicting a simulated race or any other simulated situation through which said simulated vehicle is being maneuvered;

displaying images on said crew monitor which are useful to a crew member sitting at said crew station for gathering information about the situation to convey to said driver;

monitoring the positions of said crew switches for changes in position indicating said crew member is requesting different images displayed on said crew monitor at least some of which may bear different information than the images previously displayed, and displaying the requested images on said crew monitor.

21. A method for displaying video information to a crew member position in a simulation game having a simulated vehicle with at least two places being maneuvered through a race or any other environment, said simulated vehicle having a driver station with a driver display visible from at least the driver position and a crew monitor positioned closest to a crew station in said simulated vehicle, comprising the steps:

displaying on said driver display images depicting a simulated race or any other simulated situation or environment through which said simulated vehicle is being maneuvered;

displaying one or more images on said crew monitor which are different from the images being displayed on said driver monitor and which are useful to a crew member sitting at said crew station for gathering information about the race or other situation to convey to said driver.

22. An apparatus for displaying video information to a crew member position in a simulation game, comprising:

a simulated vehicle with at least two places with controls to allow a driver to maneuver said simulated vehicle through a race or any other environment, said simulated vehicle having a driver station with at least one driver display visible from at least a driver position and having a crew position, and having a crew monitor visible at least from said crew station in said simulated vehicle and having one or more crew switches located adjacent said crew monitor;

means for displaying on said driver display images depicting a simulated race or any other simulated situation through which said simulated vehicle is being maneuvered and for changing the position and/or orientation or speed of said simulated vehicle in said race or other environment in response to manipulation of said controls;

means for displaying images on said crew monitor which are useful to a crew member sitting at said crew station for gathering information about the situation in said race or other environment to convey to said driver;

means for monitoring the positions of said crew switches for changes in position indicating said crew member is requesting that different images be displayed on said crew monitor at least some of which may bear different information about the situation in said race or other environment than the images previously displayed, and for displaying the requested images on said crew monitor.

23. An apparatus for displaying video information to a crew member position in a simulation game, comprising:

a simulated vehicle with at least two places with controls to allow a driver to maneuver said simulated vehicle through a race or any other environment, said simulated vehicle having a driver station with at least one driver display visible from at least a driver position and having a crew position, and having a crew monitor visible at least from said crew station in said simulated vehicle;

means for displaying on said driver display images depicting a simulated race or any other simulated situation through which said simulated vehicle is being maneuvered and for changing the position and/or orientation or speed of said simulated vehicle in said race or other environment in response to manipulation of said controls; and means for displaying one or more images on said crew monitor which are different from the images being displayed on said driver monitor and which are useful to a crew member sitting at said crew station for gathering information about the race or other situation to convey to said driver.

24. An apparatus for displaying video information to a crew member position in a simulation game, comprising:

a simulated vehicle with at least two places with controls to allow a driver to maneuver said simulated vehicle through a race or any other environment, said simulated vehicle having a driver station with at least one driver display visible from at least a driver position and having a crew position, and having a crew monitor visible at least from said crew station in said simulated vehicle;

a vehicle dynamics computer coupled to receive operator inputs from said controls and programmed to model the simulated responses said simulated vehicle would make in response to said control manipulations if it was a real vehicle, and programmed to receive information from vehicle dynamics computers modelling the response of other simulated vehicles in said race or other environment, and programmed to model the entire race or other environment;

a driver display computer coupled to drive said driver display and to receive race or environment modelling data from said vehicle dynamics computer indicating the situation in said race or other environment and programmed to use said race or environment modelling data to generate video signals to drive said driver display to display an image that depicts the position, speed, acceleration and orientation of said simulated vehicle in said race or other environment;

a crew display computer coupled to drive said crew display and coupled to receive race or environment modelling data from said vehicle dynamics computer and using said modelling data to generate video signals which drive said crew monitor to display one or more images on said crew monitor which are different from the images being displayed on said driver monitor and which are useful to a crew member sitting at said crew station for gathering information about the race or other situation to convey to said driver.

25. The apparatus of claim 24 further comprising one or more crew switches located adjacent to said crew monitor and which can be manipulated by a crew member sitting in said crew station of said simulated vehicle to request more or different displays, and wherein said crew display computer is programmed to monitor the positions of said one or more crew switches and to determine which images or data said crew member is requesting by manipulating of said one or more switches and using said modelling data to generate one or more video images and/or data displays requested by said crew member.

26. The apparatus of claim 25 further comprising:

a rear view display;

a left side display;

a right side display;

a rear view display computer coupled to drive said rear view display and to receive said modelling data from said vehicle dynamics model computer, and programmed to use said modelling data to generate video signals to drive said rear view display to display an image of the situation in said race or other environment behind said simulated vehicle;

a left side display computer coupled to drive said left side display and to receive said modelling data from said vehicle dynamics model computer, and programmed to use said modelling data to generate video signals to drive said left side display to display an image of the situation in said race or other environment on the left side of said simulated vehicle; and a right side display computer coupled to drive said right side display and to receive said modelling data from said vehicle dynamics model computer, and programmed to use said modelling data to generate video signals to drive said right side display to display an image of the situation in said race or other environment on the right side of said simulated vehicle.

* * * * *